US005174004A

United States Patent [19]

King et al.

[11] Patent Number: 5,174,004

[45] Date of Patent: Dec. 29, 1992

[54] RADIATOR CLAMPING JIG

[75] Inventors: Robert A. King; Kenneth J. M. Wood, both of Brisbane, Australia

[73] Assignee: King & Sons Pty. Ltd., Queensland, Australia

[21] Appl. No.: 288,957

[22] Filed: Dec. 23, 1988

[30] Foreign Application Priority Data

Jan. 5, 1988 [AU] Australia ................................ PI6171
Sep. 28, 1988 [AU] Australia ................................ 22901/88

[51] Int. Cl.[5] ................................ B23P 11/00

[52] U.S. Cl. ................................ 29/251; 29/281.1; 29/281.3; 29/243.5; 269/69; 269/155

[58] Field of Search ................................ 29/243.5, 251, 281.1, 29/281.3; 269/37, 43, 69, 254 CS, 45, 155

[56] References Cited

U.S. PATENT DOCUMENTS

| | | | |
|---|---|---|---|
| 1,758,451 | 5/1930 | Manley | 29/251 |
| 3,359,618 | 12/1967 | Murphy | 29/251 |
| 3,826,188 | 7/1974 | Eberle | 269/45 |
| 4,235,005 | 11/1980 | James | 29/281.1 |
| 4,605,208 | 8/1986 | Durham | 269/247 |
| 4,682,765 | 7/1987 | Mainville | 269/43 |

*Primary Examiner*—J. J. Swann
*Attorney, Agent, or Firm*—Nixon & Vanderhye

[57] ABSTRACT

A clamping jig releasably holds a workpiece of elongate cross section such as a radiator core. The jig includes an upright frame and a parallelogram-shaped horizontal articulated linkage having a pair of parallel side rails and a pair of end members pivotally connected to the ends of the side rails for movement about vertical axes. The side rails are spaced apart a distance greater than the width of a radiator core, and are moved by a pneumatic cylinder or other actuator so that the links pivot about their axes, and the side rails move closer together to clamp the radiator core between them. The clamping mechanism is operated by a foot pedal, for hands free operation. The vertical height of the parallelogram linkage may be readily adjusted, and hold-down elements are provided to exert a downward pressure on the radiator when it is held clamped between the side rails.

19 Claims, 7 Drawing Sheets

RADIATOR CLAMPING JIG

The present invention relates to a clamping jig assembly for holding a workpiece. In particular, the invention is directed to a radiator clamping jig for securing a radiator core while it is crimped onto, or decrimped from, a header tank.

Vehicle radiators normally comprise a heat exchanger core, a header and a tank on top thereof. The heat exchanger core typically comprises a number of vertical tubes and a plurality of closely spaced horizontal fins connected to the tubes for dissipating heat from the fluid passing through the tubes. The tubes and fins are normally made of metal, such as copper or steel. The header receives the top of the core tubes and forms the bottom of the tank. The tank portion is joined to the header to form a fluid reservoir.

Conventionally, the tank is also made of metal, such as brass, and is formed integrally with the header, or braised, soldered or otherwise welded thereto. However, such radiator construction is labour intensive and time consuming, and consequently expensive. Furthermore, welded all-metal radiators are difficult and costly to repair. In recent times, vehicle manufacturers have commenced using tanks of heat resistant plastics materials in order to minimise manufacturing costs, and radiator repairers have similarly begun to replace brass tanks with plastic tanks.

The tanks are mechanically connected to the cores using a crimping procedure to form a sealed connection between the tank and the header. More specifically, the plastic tank is positioned against a gasket or O-ring seal received in a header recess, and a tank flange is compressed against the gasket and secured in position with a series of tabs formed integrally with the header which are crimped to retain the tank compressed against the gasket. Alternatively, separate crimping strips can be placed around the header and tank flange, and crimped to maintain a sealed joint between the tank and header.

This crimping procedure is normally carried out using a radiator clamping jig to secure the core and header in a suitable position, typically, waist height, while the tabs or lugs are crimped one by one around the periphery of the header. The jigs are also used during decrimping procedures when the crimped tabs are opened out to remove the tank from the header.

There are various known clamping jigs, most of which are of the form comprising two parallel elongated side rails or walls which are brought together to clamp the radiator core between them. In one simple arrangement, the two side rails are slidably mounted on transverse rails on a vertical frame. One operator is required to support the core between the side rails while another operator brings the side rails up against the sides of the core and secures them in that position. In a modification of this arrangement, the side rails are mounted on a worm drive to enable them to be closed against the core by turning a winder wheel. Although this modification enables the radiator clamping procedure to be conducted by one operator, it requires the operator to support and steady the heat exchanger with one hand while turning the worm drive wheel with the other. As many cores are heavy and awkward to handle, the procedure is still difficult and time consuming to carry out by a single operator.

In another known radiator clamping jig, one side rail is mounted on pneumatic rams which are operated by a control lever at one side of the vertical frame. This arrangement provides speedy clamping. However, it still requires the operator to hold the heat exchanger with one hand while operating the control lever with the other. Furthermore, the side rails of this jig are both located on one side of the vertical frame, and the radiator is therefore held off-centre. While one side of the radiator is unencumbered, the other side is often obstructed by the frame thereby making it awkward to operate on that side.

In yet another known radiator clamping jig, illustrated in U.S. Pat. Nos. 4,411,414 and 4,462,146, two side rails are hingedly connected to the top of a frame enabling them to be swung apart to receive a core therebetween from underneath. The side walls are then held against opposite sides of the core. However, as downward pressure must be applied to the tank during the crimping operation, e.g. by vertical rams, an inherent disadvantage of the last described jig is that the hingedly connected side rails tend to splay under such downward pressure exerted on the tank. As a result, the top lip or flange of the header may not be supported correctly by the top inside recessed edges of the side rails, thereby hindering proper crimping/decrimping or even permitting the core to fall between the rails.

Moreover, the side rails are at fixed height and may not suit all cores and operators. Good ergonomic design requires that the crimping tabs be at approximately waist height, and the optimum height of the side rails will therefore depend on the particular operator.

Conventional tools have generally proved unsatisfactory for crimping and decrimping procedures. U.S. Pat. No. 4,462,146 describes manual crimping and decrimping tools which are specially designed to facilitate the crimping/decrimping procedures. However the crimping and decrimping tools described in the U.S. Patent are of completely different design. Hence, separate tooling is required for their construction, thereby increasing manufacturing costs. In addition, the prior art decrimping tool operates by pulling the crimped tab backwards and the tab may therefore be folded over against itself rather than being opened up.

Although the manual crimping tool of U.S. Pat. No. 4,462,146 facilitates the crimping of the tabs, it is still a slow and tedious process.

It is a general object of the present invention to overcome or at least substantially ameliorate one or more of the above described problems of the prior art.

It is a more specific object of the present invention to provide an improved clamping jig which enables the workpiece to be clamped within the jig quickly and simply.

It is another object of the present invention to provide an improved manual decrimping tool suitable for use with such clamping jig.

It is yet another object of the present invention to provide an automated crimping mechanism suitable for use with such clamping jig.

In one broad form, the present invention provides a clamping jig suitable for holding a workpiece of elongate cross section such as a radiator core or the like, said jig comprising an upright frame; and clamping means mounted on said frame, said clamping means including a parallelogram-shaped horizontal surround having a pair of parallel side rails and a pair of end members each pivotally connected to a respective end of both side rails; and means for pivoting said end members relative to said side rails to vary the spacing between said side rails whereby the workpiece may be releasably clamped between the side rails.

Preferably, the frame is a demountable assembly and consists of a pair of legs and a crossbeam adapted to be mounted across the top of the legs. The clamping means is provided at its ends with sleeve members, typically box tubes, which are slidably adjustable in height along the legs. Similarly, the crossbeam can be mounted at its ends on sleeve members, such as box tubes, which are slidably adjustable along the legs. The sleeve members can be fixed into position by means of looking pins inserted in registered apertures in the sleeve members and the legs themselves.

A significant advantage of the demountable frame assembly is that the clamping jig can be disassembled quickly and easily for transport, servicing or repair. Furthermore, the height of the clamping means and crossbeam can be adjusted to suit different radiator cores and operators.

Preferably, the means for pivoting the end members relative to the side rails, i.e. for skewing the parallelogram surround in the horizontal plane, comprises a pneumatically operated cylinder. The cylinder may suitably be mounted on a sleeve member, the distal end of its piston ram being connected to one of the end members. The pneumatic cylinder is preferably operated by a foot switch or pedal, thereby providing hands-free operation of the clamping means. This leaves both hands free for the operator to support and position the workpiece between the side walls prior to clamping.

In the preferred embodiment, the jig is designed for clamping a radiator core during the crimping of a plastic tank to the core header, or its decrimping. In order to maintain the tank compressed against the header during crimping and decrimping operations, one or more upright pneumatic cylinders are mounted to the crossbeam and arranged to press downwardly on the plastic tank.

The end members of the clamping parallelogram are preferably mounted so as to pivot about respective vertical axes which are located centrally of the end members and in approximately the same vertical plane as the overhead upright pneumatic cylinder(s). In this manner, the radiator core will be automatically clamped centrally with respect to the overhead cylinders regardless of the width of the core.

Advantageously, rail members are provided along the outer sides of the side rails for slidably mounting a crimping device, which may be either a crimping machine or a manual crimping/decrimping tool.

According to another aspect of the present invention, there is provided a semi-automatic crimping device suitable for crimping tabs on a radiator held within the abovedescribed clamping jig, said crimping device comprising a housing adapted for mounting to the outer side of said side rails and slidable therealong, an elongate crimping tool operatively extending forwardly from said housing towards the radiator, a pneumatically operated mechanism located within said housing and connected to said crimping tool, the mechanism being operative to impart a combination of forward and downward movements to the forward tip of said crimping tool, and manually operable switch means on the exterior of said housing for actuating said pneumatically operated mechanism.

In the preferred embodiment, the pneumatically operated mechanism comprises a pneumatic diaphragm or cylinder having a ram or piston which is connected to the rear end of the crimping tool via a clevis fitting. A cam follower mechanism is provided between the crimping tool and the housing for constraining the forward tip of the tool to move forwardly and downwardly upon extension of the air ram or piston.

Adjustment means are suitably provided for varying the height and forward travel of the tool tip relative to its housing to suit different radiators.

According to yet another aspect of the invention, there is provided a manual decrimping tool suitable for use in decrimping crimped tabs on an automotive radiator held within the abovedescribed clamping jig, said decrimping tool comprising a first elongate handle having a transverse channel portion adjacent the forward end thereof and adapted to engage the outer side of a side rail of said clamping jig;

a pivot bar having one end pivotally connected to said first handle and its other end fixedly connected to a second handle located above said first handle;

a tool bit fastened to the forward end of said second handle and protruding longitudinally therefrom, said tool bit having a claw-like tip; and a third handle located above said second handle and pivotally connected intermediate its ends to said second handle, said third handle having its forward end protruding beyond the forward end of said second handle for abutment against said side rail, whereby squeezing of said second and third handles together will cause said third handle to pivot about its forward end and withdraw said second handle and the claw tip away from said radiator.

That is, after first positioning the claw tip at the head of a crimped tab, the second and third handles are squeezed together to open out the tab. The first (lowermost) handle is relaxed slightly to allow the tool to lift while the tab is opened out in an arc.

The claw tip of the tool bit may be bifurcated to enable two tabs to be decrimped simultaneously. A leaf or coil spring may also be provided between the second and third handles to bias the handles apart and facilitate the controlled squeezing action of the two handles.

In order that the invention may be more fully understood and put into practice, preferred embodiments thereof will now be described with reference to the accompanying drawings, in which.

Figure 1:
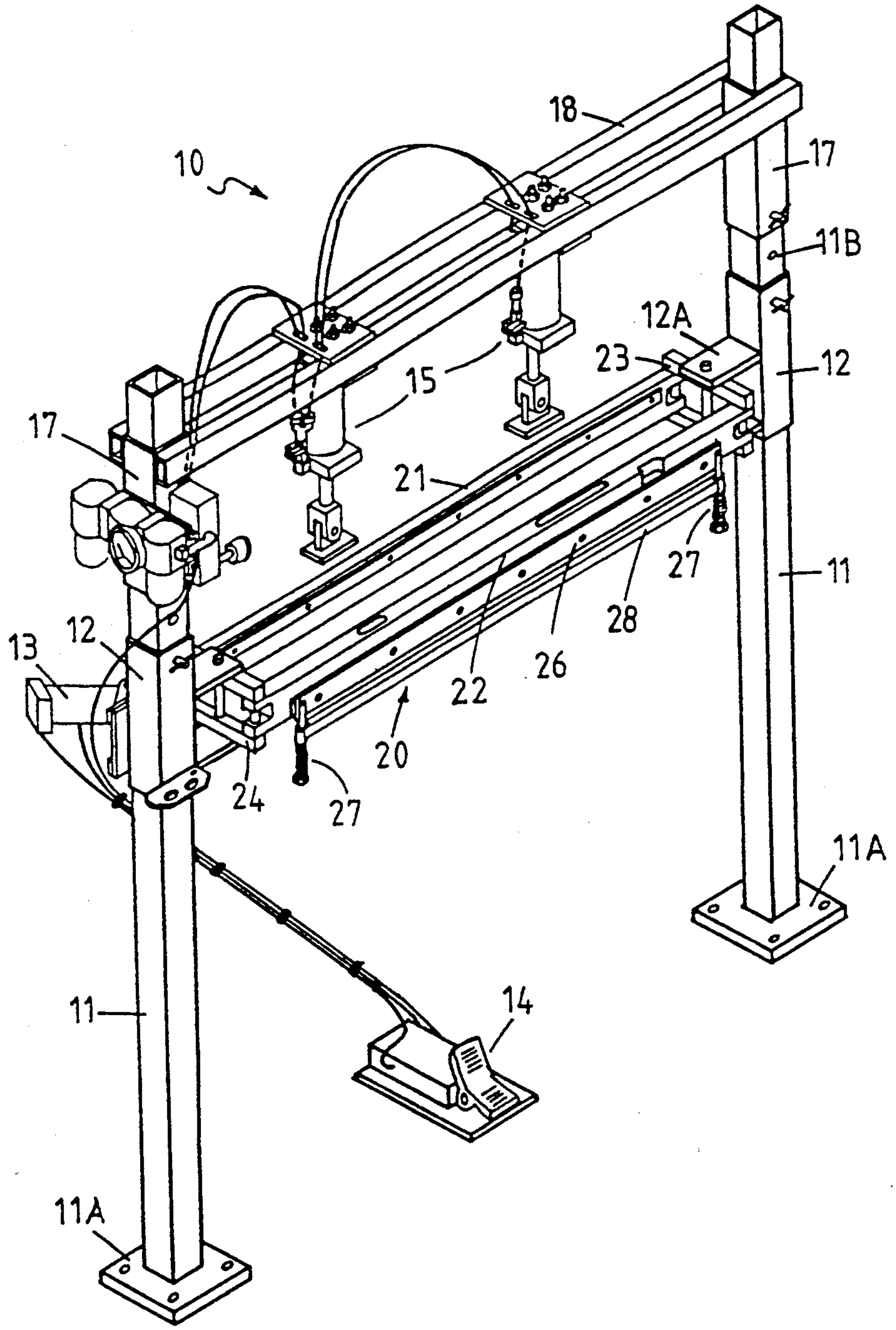
FIG. 1 is a perspective view of a radiator clamping jig according to the preferred embodiment of the invention.

The preferred embodiment of the invention is designed for clamping vehicle radiator cores. However, the jig is also suitable for clamping other workpieces while they are being worked. As shown in FIG. 1, the radiator clamping jig 10 of the preferred embodiment comprises a demountable assembly consisting of a pair of spaced legs 11, a horizontally-arranged clamping means 20 mounted on box tubes 12 which are vertically adjustable along the legs 11, a top crossbeam 18 mounted across the top of legs 11, and a pair of pneumatic rams 15 mounted to the crossbeam 18. As the clamping jig is demountable, it can be disassembled into its component parts for transport, servicing or repair.

Each leg 11 is provided with a base 11A which is fastened to the floor by suitable fastening means. Each leg is also provided with a series of spaced apertures 11B thereon. Corresponding apertures are provided in the box tubes 12 of the clamping means 20 so that the clamping means can be locked into position at a desired height by inserting locking pins through registered apertures in the box tubes 12 and legs 11. In this manner, the height of the clamping means 20 can be adjusted to suit the particular core and operator.

Figure 2:
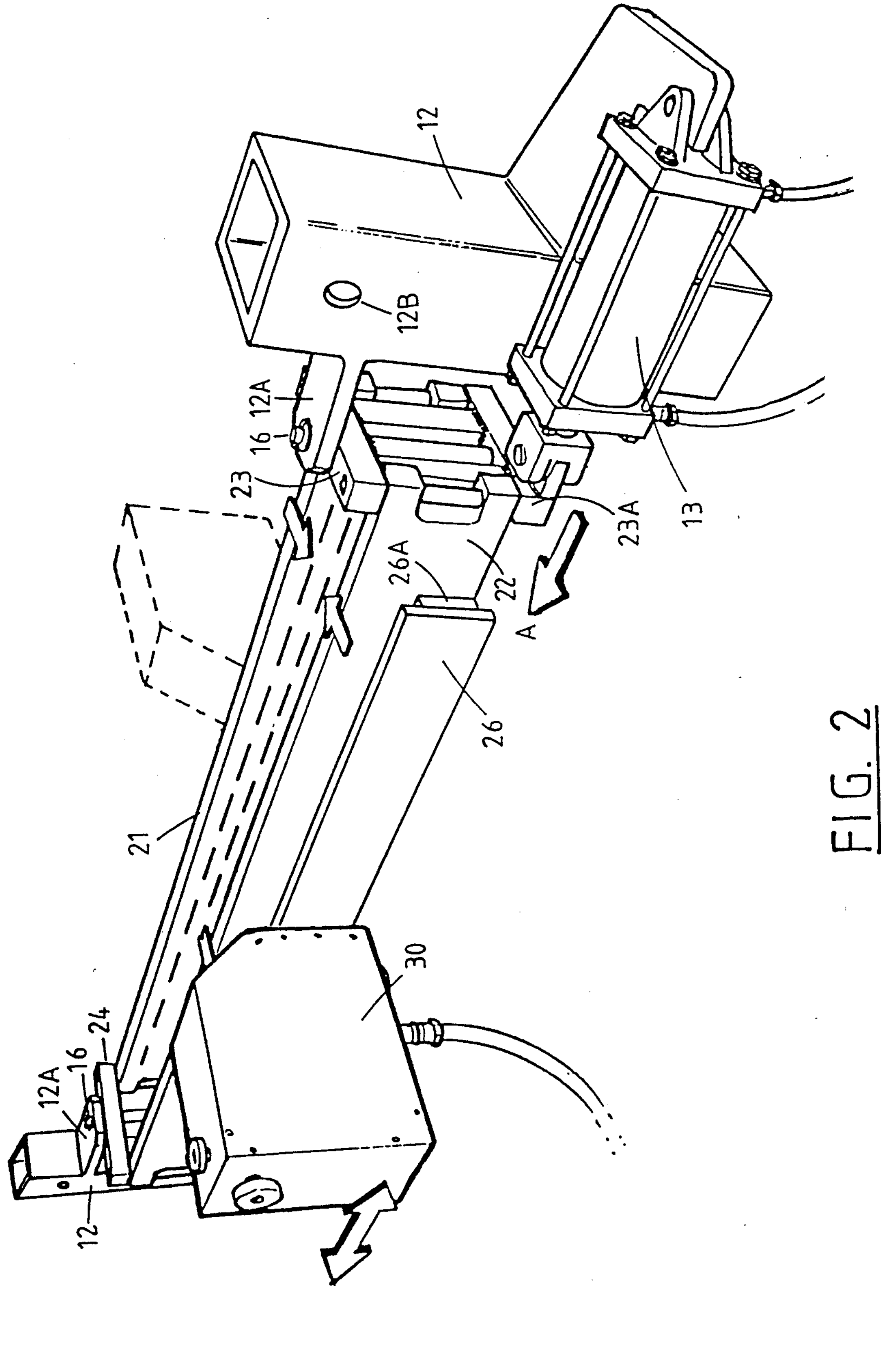
FIG. 2 is a perspective view of the clamping means of the jig of FIG. 1.
Figure 3:
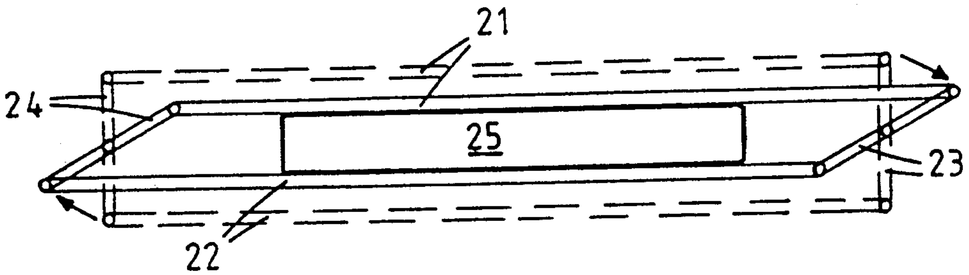
FIG. 3 is a schematic plan view illustrating the operation of the clamping means of FIG. 2.
Figure 9A:
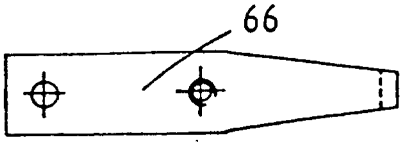
FIGS. 9A to 9D are plan views of the tool tips of FIGS. 8A to 8D respectively.
Figure 9B:
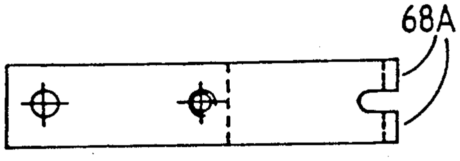
Figure 9C:
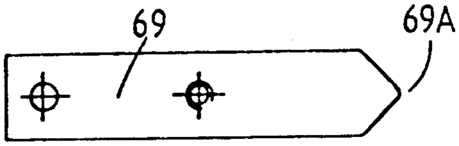

As illustrated more clearly in FIGS. 2 and 3, the clamping means 20 comprises a parallelogram-shaped linkage arrangement having two opposed elongated side rails 21, 22, and two shorter end members 23, 24 each of which is pivotally connected to respective ends of the side rails 21, 22. The length of end members 23, 24 determines the maximum spacing between side rails 21, 22 and is suitably chosen so that all selected radiator core/headers can be accommodated between the rails 21, 22 with a comfortable working clearance. Due to the pivotal connections between the four members of the parallelogram linkage, the end members 23, 24 can be pivoted relative to the side rails 2, 22 as illustrated in FIG. 3 so as to reduce the spacing between the side rails 21, 22, and thereby clamp the radiator/core therebetween. Preferably the four members 21–24 are hinged to maintain their vertical orientation during use.

The end members 23, 24 are pivotally mounted on respective brackets 12A formed on the box tubes 12. The vertical pivot pin 16 of each pivotal mounting is suitably located midway between the connections of the end members 23, 24 to the side walls 21, 22. Furthermore, the pivot pins 16 are located in the vertical operating plane of the clamping jig assembly, i.e. the plane containing air cylinders 15. In this manner, the radiator core/header will be automatically centred within the operating plane of the clamping jig, and the tank will always be aligned with the rams 15 mounted on crossbeam 18, regardless of the width of the radiator.

The parallelogram linkage of the clamping means is initially opened to rectangular configuration to maximise the spacing between the side rails 21, 22. The core is then inserted between the side rails. The clamping of the side rails 21, 22 is achieved by skewing or pivoting the parallelogram linkage. In the illustrated embodiment, a pneumatically operated cylinder 13 is mounted on a box tube 12 and has an extendible ram which is pivotally connected to a bracket 23A formed on one of the end members 23. Extension of the ram of the cylinder 13 in the direction of the arrow A of FIG. 2, will bring the side rails 21, 22 together to clamp the core therebetween. The cylinder 13 is operated by a foot switch or pedal 14, thereby allowing the operator to use both hands to support and position the core. The lateral clamping pressure is kept to a minimum to avoid damage to the core. Furthermore, the side rails can be closed, opened or stopped in any intermediate position by operation of foot pedal 14.

Although a pneumatic cylinder 13 is preferably used to operate the clamping means 20, any other suitable device may be used. For example, a hydraulic cylinder or an electro-mechanical device, such as a solenoid, may alternatively be used.

Figure 4:
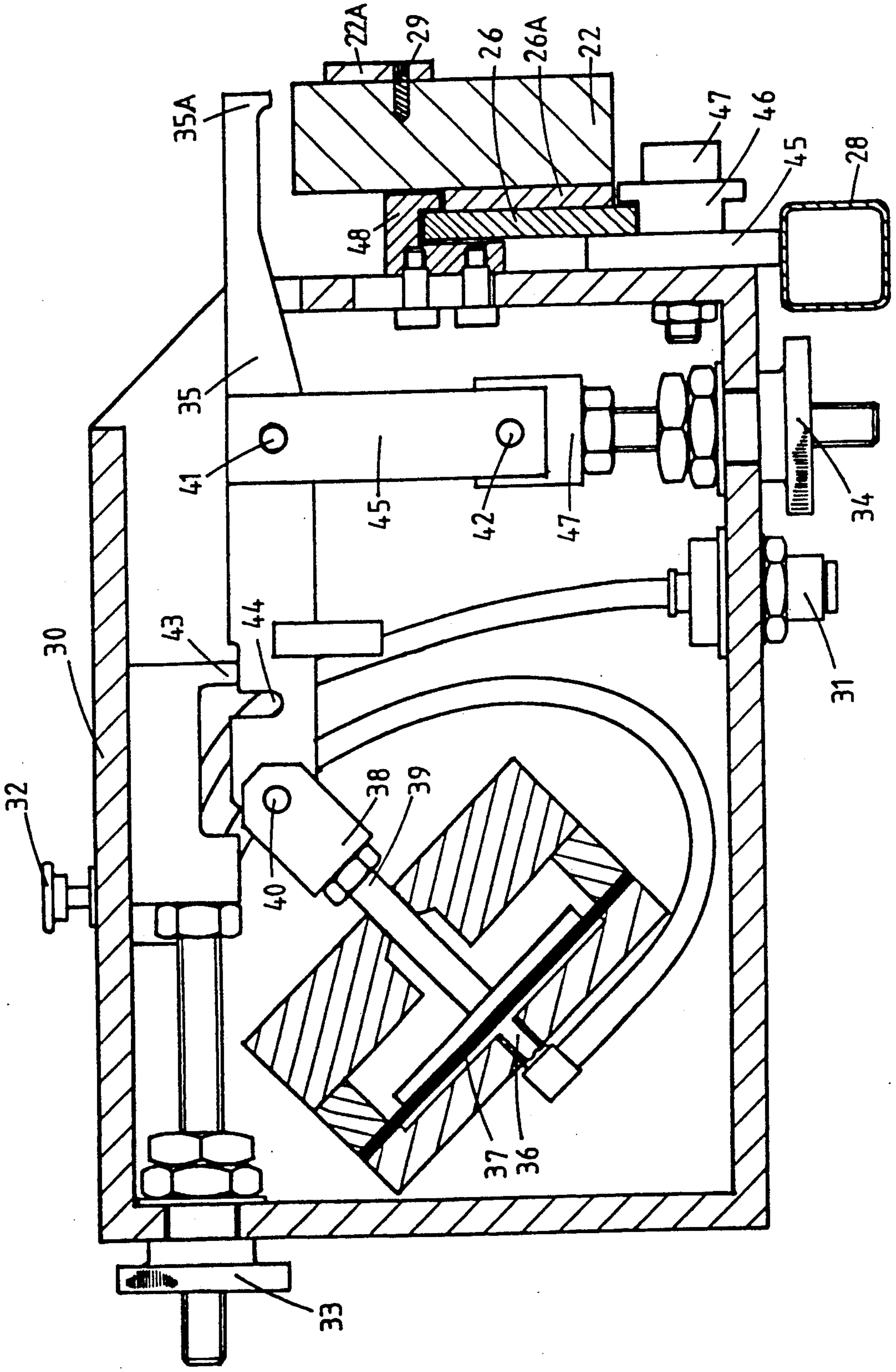
FIG. 4 is a sectional elevational view of the automated crimping means of FIG. 1.

As can be seen more clearly in FIGS. 1 and 4, support strips 21A, 22A are fastened to the inside faces of side rails 21, 22 respectively, by off-centre fasteners 29. The support strips 21A, 22A are recessed below the top of their associated side rails so as to provide a recessed inner lip to support the header flange. (In order to change the recess depth, the support strips are simply unfastened and inverted. The off-centre fastening thereby results in a different recess depth of the inner lip). The support strips 21A, 22A can easily be removed to accommodate certain cores which use separate crimping strips.

The radiator header plate may be provided with an integral serrated or castellated flange (not shown) forming a series of lugs or tabs extending around the top peripheral edge of the header. Alternatively, separate crimping strips having a series of tabs can be used. An O-ring seal or gasket is placed around a top lip of the header and a plastic tank is placed thereon to form a fluid reservoir, the tank having a flange which is pressed onto the gasket. When joining a plastic tank to a core, the tank must compress the gasket sufficiently against the header to form a seal before any crimping is performed. The tabs are only retainers, maintaining the pressure seal established by squeezing the tank into the gasket. In the preferred embodiment, the plastic tank is pressed against the gasket by means of pneumatic rams 15 mounted on crossbeam 18. Box tubes 17 are fitted to the ends of the crossbeam to enable the crossbeam to be selectively adjusted along legs 11. The crossbeam 18 can be locked in a desired position by inserting locking pins through registered apertures in the box tubes 17 and legs 11.

The pneumatic cylinders 15 can be slidably adjusted along the length of crossbeam 18, and then locked into position by fastening the cylinder mounts. A clevis fitting is provided at the bottom end of the ram of each pneumatic cylinder 15, a small bearing plate being fitted to each clevis fitting. In this manner, the bearing plate can tilt to accommodate inclined tank tops.

The tabs or lugs formed by the serrated or castellated edge of the header flange, or on the crimping strips, are crimped over the tank flange while the tank is compressed by rams 15. On retraction of the rams 15, the pressure seal between the tank flange, gasket and header will be maintained by the crimped lugs, thereby provided a sealed mechanical connection of the plastic tank to the core header.

As the clamping assembly 20 is quite heavy, (approximately 60 kg) it is preferable to raise and lower the clamping assembly 20 mechanically in order to avoid injury to the operator through manual lifting. The clamping assembly 20 can be raised and lowered by means of one or more of the pneumatic cylinders 15. The bearing plate is removed from the clevis fitting at the bottom end of the ram of the pneumatic cylinder 15, and replaced with a beam coupling attachment (not shown) which has a sectional shape approximating an inverted "T". The beam coupling attachment is lowered between the rails 21, 22 which are then closed about the coupling attachment by suitable operation of the pneumatic cylinder 13 by foot pedal 14. Preferably, the rails 21, 22 are closed about the coupling attachment, but do not clamp it, so that the box tubes 20 slide more easily along their respective legs 11. The looking pins in the box tubes 12 are removed and the clamping assembly 20 is raised and lowered as required by operation of the pneumatic cylinder 15. The clamping means can be looked into its new position by reinserting the locking pins into the registered apertures at the new height.

To vary the height of the top crossbeam 18, the rails 21, 22 are closed together and the rams of the pneumatic cylinders 15 are extended so that the bearing plates abut against the tops of rails 21, 22. The locking pins in box sections 17 are then removed and the crossbeam can be adjusted to the desired height by operation of cylinder(s) 15. It will be apparent to those skilled in the art that the spacing between the apertures in legs 11 will govern the size of the vertical increments in which the top beam 18 and clamping assembly 20 can be adjusted.

The crimping of the tabs can be performed manually or by using a crimping machine. FIGS. 4 and 5 illustrate an air-operated semi-automatic crimping machine 30 which can be slidably mounted on either one of open-ended rails 26 fixed on the outside of the side rails 21, 22. Only side rail 22 is shown in FIG. 4, the construction of the rail 26 on side rail 21 being of identical configuration. The rail 26 is spaced from its respective side rail 21, 22 by a narrower intermediate rail 26A so that the composite rail 26, 26A has a T-shaped cross section as shown in FIG. 4.

The crimping machine 30 is provided on its front face with a hooked flange 48 which enables it to hang from rail 16. The front face of the crimping machine 30 is also provided with a stub axle 47 on which are mounted co-axial rollers 45, 46. Roller 46 is designed to roll along the bottom face of rail 16 while roller 45 rolls along a bias-mounted support bar 28 located below each rail 21, 22. As can be seen in FIG. 1, the support bar 28 is spring-mounted on two short rods 27 connected to the ends of each rail 26. Alternatively, the support bar 28 can be mounted on hydraulic or pneumatic cylinders. (The function of the support bar 28 will be described below). The crimping machine 30 can be inserted onto, and removed from, either end of the rail 26 quickly and simply, and is free to slide along either rail to operate on both sides of a core clamped within the clamping means 20.

As shown in FIG. 4, the air-operated crimping machine 30 has an inlet 31 for connection to a source of compressed air. The inlet 31 is connected to chamber 36 of a piston assembly within the crimping machine via a push button valve 32. On depressing valve button 32 therefore, the valve is opened to pressurise the chamber 36 of the piston assembly. One wall of the chamber 36 is defined by a flexible diaphragm 37 which expands outwardly on pressurization of chamber 36 to extend piston ram 39.

A crimping mechanism is connected to the distal end of piston ram 39. This crimping mechanism comprises a tool bit 35 which is pivotally connected at pivot point 40 to a clevis fitting 38 at the end of piston 39. The tool bit 35 is also pivotally connected at pivot point 41 to a link member 45 which, in turn, is pivotally connected at pivot point 42 to a clevis mount 47 of adjustable height. A transverse slot or recess 44 is provided on the top side of the tool bit 35. The free end of the tool bit 35 is provided with a crimping tip 35A, typically of hardened steel. A profiled stop 43 is located above the tool bit as shown in FIG. 4. The recess 44 is dimensioned to receive the profiled stop 43. The profiled stop 43 and recess 44 act as a cam follower mechanism as explained below.

Figure 5A:
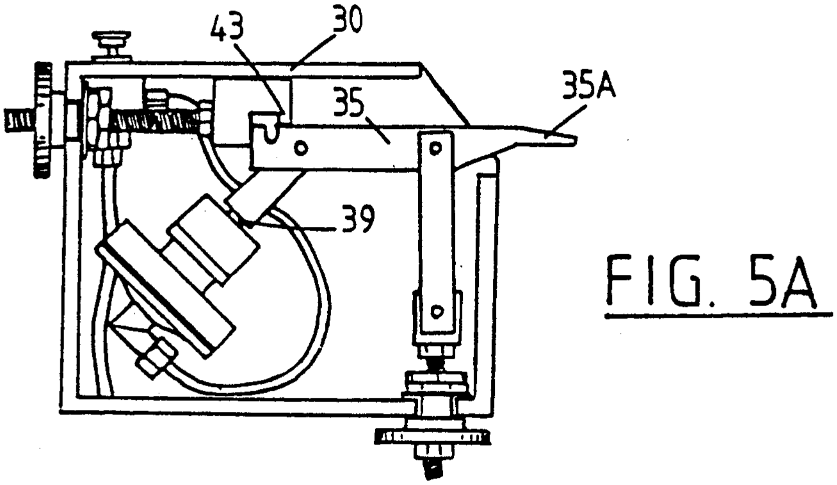
FIGS. 5A to 5C are sectional elevational views illustrating the operation of the automated crimping means of FIG. 4.
Figure 5B:
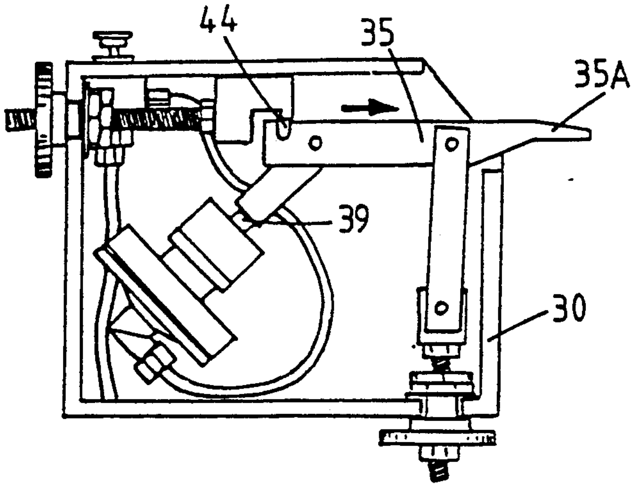
Figure 5C:
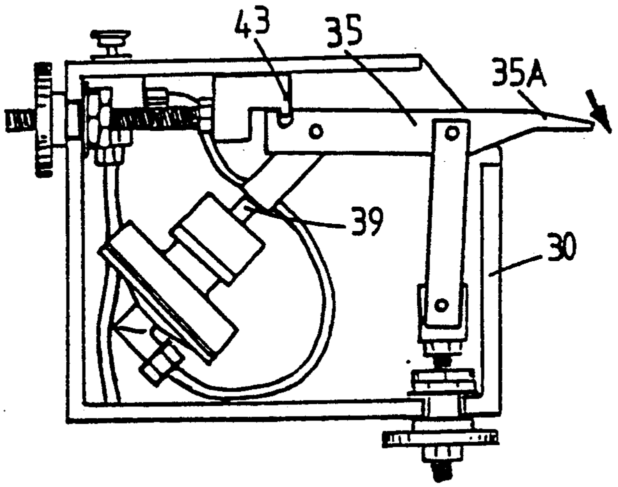

Operation of the crimping machine 30 is illustrated schematically in FIGS. 5A to 5C. Upon pressurization of chamber 36, an axial force will be imparted to piston ram 39 and this force will be transmitted to pivot point 40. When resolved into its components, the force acting on pivot point 40 consists of an upward force and a forward force. As the tool bit 35 is prevented from moving upward by step 43, it is constrained to move forward (i.e. against the tab to be crimped), pivoting on pivot point 42 as shown in FIG. 5B. Once the tool bit 35 has moved forward to a position where the recess 44 is aligned With the profiled stop 43, the tool bit 35 is able to pivot upwardly about pivot point 41 so that extension 43 will be received within recess 44. This causes a downward movement of the tool tip 35A as shown in FIG. 5C. Thus, the crimping action of the tool tip 35A comprises an initial forward movement followed by a downward movement. The cam-like engagement of extension 43 within recess 44 not only provides the downward movement at tool tip 35A, but also limits the forward movement of the tool bit 35. The height and forward travel limit of the tool tip 35A are adjustable by thumbwheel mechanisms, 34, 33, respectively, to suit different header flanges and crimping strips. The height and forward travel limit are preferably adjusted so that during the initial forward thrust of the tool bit 35, the tool tip 35A engages a crimping tab and only partially bends it over the edge of the plastic tank flange (which is held down on the header gasket under pressure). Subsequently, during the downward movement of the tool tip 35A, the tab is crimped onto the tank flange to maintain the pressure seal between the tank, gasket and header.

Preferably, the tool tip 35A is bifurcated to enable two tabs to be crimped simultaneously.

Release of button 32 will close its associated valve to thereby depressurize chamber 36. The piston 39 is reversed biased so that when the chamber 36 is depressurized, it will retract the tool bit 35 to its initial position. The crimping operation is therefore performed simply by depressing and releasing the valve button 32. The crimping machine 30 is then moved on to the next tab(s) by sliding along rail 26, and the procedure is repeated. It will be apparent to those skilled in the art that the semi-automatic operation of the crimping machine facilitates the crimping operation and enables it to be completed in far less time than the manual crimping devices hereto used.

Automated mechanisms for decrimping have not yet been developed. Furthermore, in small operations, the cost of an automated crimping machine may not be warranted. For the foregoing reasons, operators still use manual decrimping and/or crimping tools.

Figure 6B:
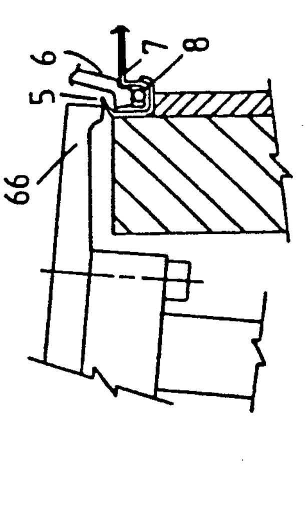
FIGS. 6A to 6D are sectional schematic views of a manual crimping tool suitable for use with the jig of FIG. 1 and its operation.
Figure 6D:
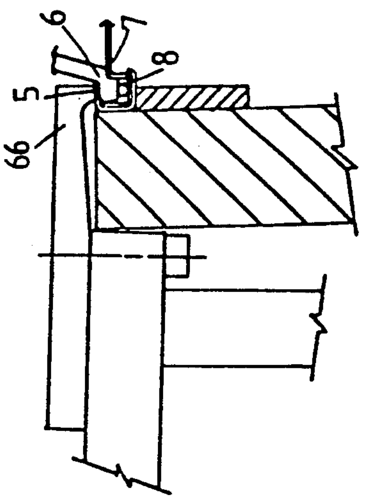
Figure 6A:
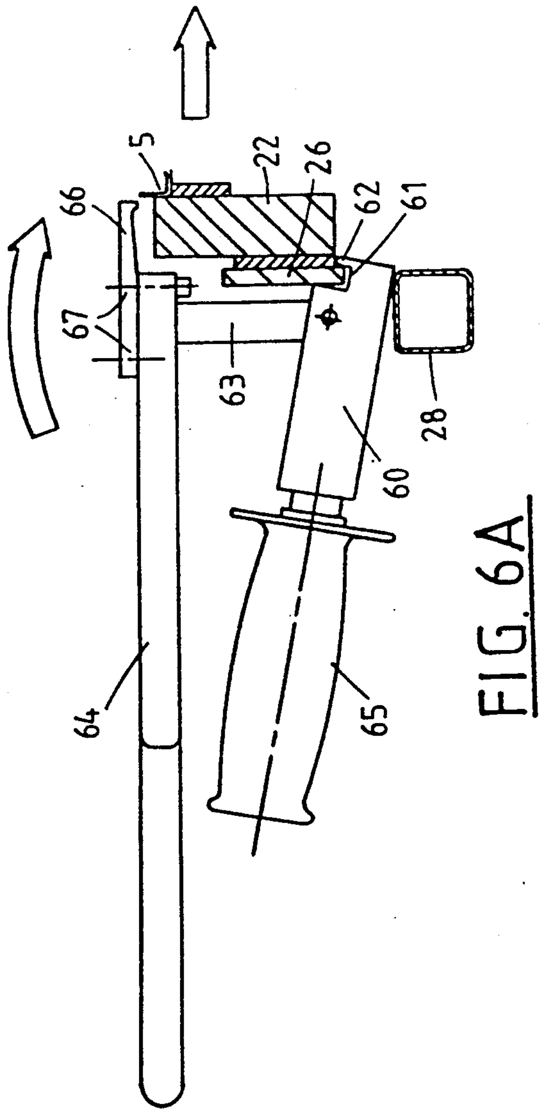

FIG. 6A illustrates a crimping tool suitable for use with the clamping jig of this invention. The crimping tool comprises a bottom handle 60 having a hand grip 65 provided at one end thereof. The bottom handle 60 is pivotally connected to a pivot bar 63 in a suitable manner, for example by a clevis fitting. A top handle 64 is fastened at right angles to the pivot bar 63, and a crimping tool bit 66 is removably mounted on the top of the forward end of handle 64 by threaded fasteners 67 e.g. Allen screws. The bottom handle 60 is provided with a transverse slot or channel 61 on its upper side.

To commence the manual crimping operation, the crimping tool is mounted to a side rail as shown in FIG. 6A. That is, the bottom handle 60 is inserted between a rail 16 and its associated spring-loaded support bar 28 such that the bottom edge of the rail 16 is received within the channel 61 and the handle 60 rests upon the support bar 28. As the support bar 28 is spring-loaded or otherwise bias-mounted, it is able to deflect downwardly to allow insertion of the bottom handle 60 yet it at least partially supports the weight of the crimping tool, thereby facilitating its use. The degree of support provided by support bar 28 can be varied to suit the operator by adjusting the tension of the springs on rods 27. The height of the support bar 28 can also be adjusted by the nuts on threaded rods 27. Once the bottom handle is correctly inserted, the forward lip 62 thereof will abut against the bottom of intermediate rail 16A.

Figure 6C:
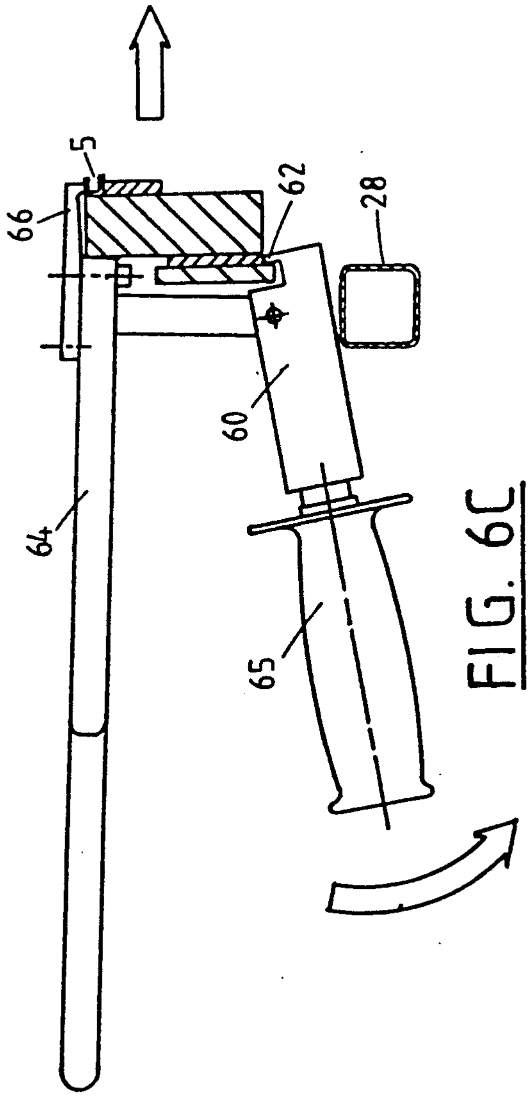

With the crimping tool set up as shown in FIG. 6A, the top handle 64 is raised to bring the crimping tool tip 66 up into contact with a tab 5 to be crimped. During this operation, the top handle 64 and pivot bar 63 pivot about the connection of the pivot bar 63 to the bottom handle 60. While using the handpiece 65 on the shorter bottom handle 60 to control the contact height of the tool tip 66 so that it engages near the top edge of the tab 5, the top handle 64 is lifted in an arc to push the tab over to at least 45 degrees as shown in FIG. 6B. Thereafter, while applying sufficient force on the top handle 64 to hold the tool tip 66 against the tab 5, a firm downward force is applied to the lower handle 60 to squeeze or crimp the tab 5 down flat as shown in FIG. 6C. The crimped tab 5 maintains the pressure seal between the tank flange 6, gasket or O-ring seal 8 and header 7, as shown in FIG. 6D. The crimping tool is then reconfigured to its starting configuration shown in FIG. 6A, and moved to the next tab to be crimped by sliding between rails 16 and support bar 28. This procedure is repeated for all tabs on both sides of the tank, the tabs at the ends being crimped with conventional tools.

Figure 7A:
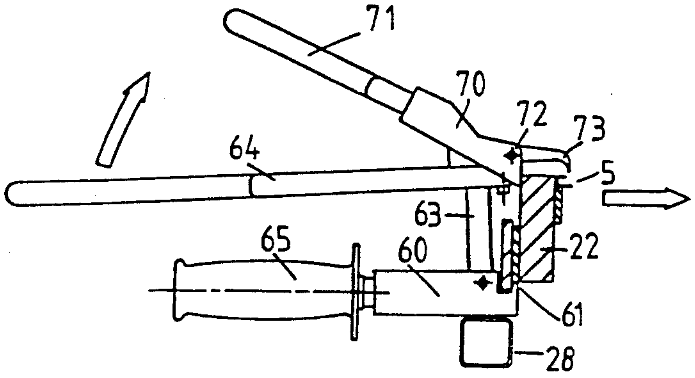
FIGS. 7A to 7F are sectional schematic views of a manual decrimping tool suitable for use with the jig of FIG. 1 and its operation.

A decrimping tool is shown in FIG. 7A. The decrimping tool is similar to the crimping tool in that the bottom handle 60 and handpiece 65, pivot bar 63 and top handle 64 are common to both tools. This results in lower tooling and manufacturing costs, and allows the decrimping tool to be converted to a crimping tool by relatively simple modification.

In the decrimping tool, the tool tip 66 of the crimping tool is replaced with a decrimping tool tip 73 having a claw end. In addition, a third handle is pivotally mounted to the second handle at the decrimping tool tip 73 by means of a clevis fitting 70 and pivot pin 72. Operation of the decrimping tool will now be described with reference to FIGS. 7A to 7F.

Figure 7B:
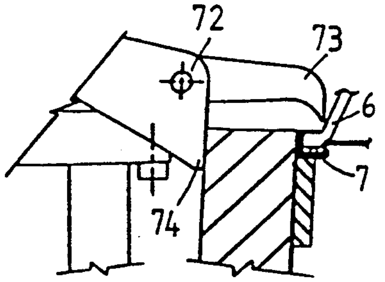
Figure 7C:
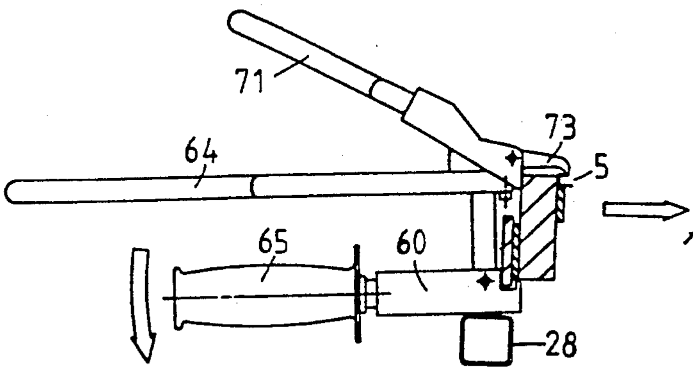
Figure 7D:
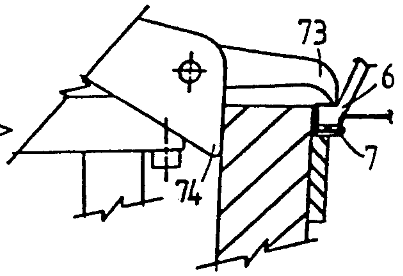
Figure 7E:
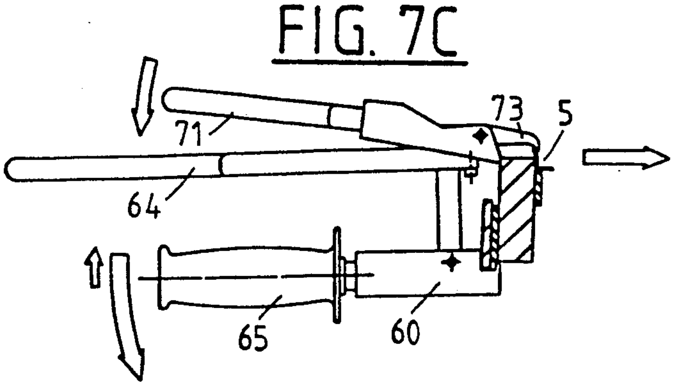
Figure 7F:
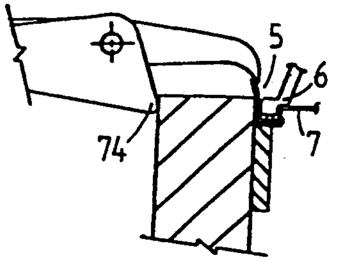

The bottom handle 60 is inserted between the rail 16 and spring-loaded support bar 28 in a similar manner to the crimping tool. The second handle 64 is then raised to bring the claw end of the decrimping tool tip 73 up against the tank 6 as shown in FIG. 7B. Downward pressure is then applied to the lower handle 60 to force the claw end of the decrimping tool tip 73 behind the edge of the tab 5 as shown in FIGS. 7C and 7D. The two top handles 64, 71 are then squeezed together like a pair of pliers to pull the tab 5 back just clear of the tank as shown in FIGS. 7E and 7F. When the two handles 64, 71 are squeezed together, the top handle 71 pivots about the abutment of its protruding lower lip 74 against the side rail 22. As the tool 73 is offset from the centre of rotation of handle 71, the tool 73 is withdrawn in an arc to open out the crimped tab 5. During the uncrimping of tab 5, moderate pressure is maintained on the bottom handle 60 to prevent the claw tip from jumping off the tab, yet controlled upward movement of the bottom handle 60 is allowed to enable the tab to be uncrimped in an arc rather than being pulled straight back against itself. By pulling the tab 5 back in an arc, it will be left in an open position suitable for recrimping.

Advantageously, a leaf or coil spring (not shown) is provided between handles 64, 71.

FIGS. 8 and 9 illustrate various types of tool tips which may be used with the crimping and uncrimping tools of FIGS. 6 and 7. (Note however, that the illustrated tool tips are not exhaustive of all tips which may be used). FIGS. 8A and 9A illustrate a simple bull-nosed crimping tip 66 for crimping one tab at a time. The crimping tip 68 of FIGS. 8B and 9B has a bifurcated tip 68A enabling two tabs to be crimped simultaneously. FIGS. 8C and 9C illustrate yet another crimping tip 69 having a pointed nose 69A.

Figure 8A:
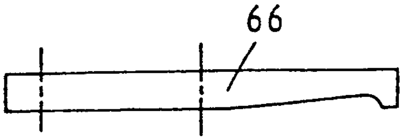
FIGS. 8A to 8D are elevational views of tool tips for use with the crimping tool of FIG. 6A and decrimping tool of FIG. 7A.
Figure 8B:
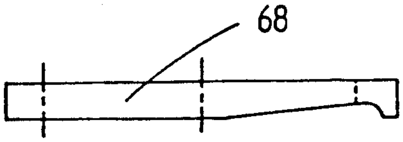
Figure 8C:
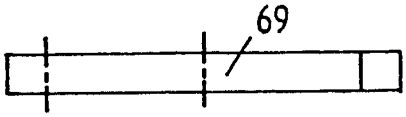
Figure 8D:
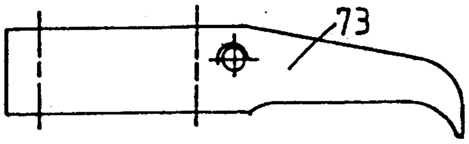
Figure 9D:
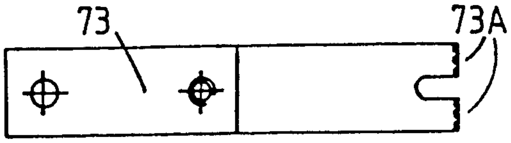

FIGS. 8D and 9D illustrate the decrimping tip 73 used in the decrimping tool of FIG. 8. This tip 73 has a bifurcated claw 73A which enables two tabs to be decrimped simultaneously.

The tool tips are typically made from annealed tool steel, and are suitably hardened and tempered.

The foregoing describes only some embodiments of the invention and modifications which are obvious to those skilled in the art may be made thereto without departing from the scope of the invention as claimed in the following claims.

We claim:

1. A clamping jig suitable for holding a radiator core, said jig comprising:

an upright frame;

clamping means mounted on said frame, said clamping means including a parallelogram-shaped horizontal articulated linkage having a pair of parallel side rails, and a pair of end members each pivotally connected to a respective end of both side rails for movement about parallel vertical axes; said side rails having a first position in which they are parallel to each other and spaced apart a distance greater than the width of a radiator core, and a second position in which they are spaced apart a distance equal to the width of a radiator core; and means for pivoting at least one said end member relative to said side rails to vary the spacing between said side rails, to move them between said first position and said second position so that a radiator core is releasably clamped between the side rails in the second position.

2. A clamping jig as claimed in claim 1, wherein said frame is demountable and comprises a pair of leg members and a crossbeam adapted to be mounted across the top of said leg members; said clamping means end members being mounted on sleeve members slidably adjustable in height along said leg members.

3. A clamping jig as claimed in claim 2, wherein said crossbeam has first and second ends and is mounted at said ends on sleeve embers which are slidably adjustable in height along said leg members.

4. A clamping jig as claimed in claim 3, wherein apertures are provided in said leg member and in the sleeve members of said clamping means and said crossbeam, said clamping means and said crossbeam being fixable at a preselected height by means of locking pins inserted through registered apertures in respective sleeve members and leg members.

5. A clamping jig as claimed in claim 2, further comprising hold down means mounted to said crossbeam for exerting downward pressure on a workpiece held in said clamping means.

6. A clamping jig as claimed in claim 5, wherein said hold down means comprises at least one upright pneumatic cylinder extending downwardly from said crossbeam.

7. A clamping jig as claimed in claim 1, wherein said pivoting means comprises a pneumatically operated cylinder connected to one of said end members.

8. A clamping jig as claimed in claim 7, further comprising a floor-mounted foot switch or pedal, said pneumatically operated cylinder being operable by said foot switch or pedal.

9. A clamping jig as claimed in claim 1, further comprising a rail member mounted longitudinally along the outer face of each said side rail.

10. A clamping jig as claimed in claim 9, further comprising a support bar located below each said rail member and biased at a predetermined distance thereunder.

11. A clamping jig as claimed in claim 6, wherein each end member of said clamping means is pivotally mounted about a respective vertical pivot axis located centrally of the connections of said end member to the side rails, and wherein the pivot axes of said end members and the centre axes of said upright pneumatic cylinder(s) lie substantially in the same vertical plane.

12. A clamping jig as claimed in claim 1, wherein each side rail has an upper inside lip recessed below the top of the side rail.

13. A clamping jig suitable for holding a radiator core, said jig comprising:

an upright frame clamping means mounted on said frame, said clamping means including a parallelogram-shaped horizontal articulated linkage having a pair of parallel side rails and a pair of end members each pivotally connected to a respective end of both side rails;

means for pivoting at least one said end member relative to said side rails to vary the spacing between said side rails, whereby the workpiece may be releasably clamped between and juxtaposed with the side rails; and foot-operable actuating means for selectively operating the pivoting means.

14. A clamping jig as claimed in claim 13, wherein said frame is demountable and comprises a pair of leg members and a crossbeam adapted to be mounted across the top of said leg members; said clamping means end members being mounted on sleeve members slidably adjustably in height along said leg members.

15. A clamping jig as claimed in claim 13, wherein said pivoting means comprises a pneumatically operated cylinder connected to one of said end members.

16. A clamping jig as claimed in claim 13, wherein each side rail has an upper inside lip recessed below the top of the side rail.

17. A clamping jig as recited in claim 13, further comprising a rail member mounted longitudinally along the outer face of each said side rail, and a support located below each rail each said rail member biased at a predetermined distance thereunder.

18. A clamping jig suitable for holding a radiator core, said jig comprising:

an upright frame;

clamping means mounted on said frame, said clamping means including a parallelogram-shaped horizontal articulated linkage having a pair of parallel side rails and a pair of end members each pivotally connected to a respective end of both side rails;

means for pivoting at least one said end member relative to said side rails to vary the spacing between said side rails, whereby the workpiece may be releasably clamped between the side rails;

a rail member mounted longitudinally along the outer face of each said side rail; and a support bar located below each said rail ember and biased at a predetermined distance thereunder.

19. A clamping jig as claimed in claim 18, wherein each side rail has an upper inside lip recessed below the top of the side rail.

* * * * *